United States Patent [19]

Hamano

[11] Patent Number: 5,040,077
[45] Date of Patent: Aug. 13, 1991

[54] FACSIMILE APPARATUS COMPRISING AUTOMATIC COMMUNICATION MODE

[75] Inventor: Hiroaki Hamano, Osaka, Japan

[73] Assignee: Minolta Camera Kabushiki Kaisha, Osaka, Japan

[21] Appl. No.: 482,878

[22] Filed: Feb. 21, 1990

[30] Foreign Application Priority Data

Feb. 23, 1989 [JP] Japan .................................. 1-44138

[51] Int. Cl.5 ................................................ H04N 1/32
[52] U.S. Cl. ..................................... 358/407; 358/434; 358/437; 358/438; 364/231.5
[58] Field of Search ............... 358/400, 402, 403, 407, 358/425, 434, 435, 436, 437, 438, 439, 442; 364/231.5, 242

[56] References Cited

U.S. PATENT DOCUMENTS

| 4,454,575 | 6/1984 | Bushaw et al. | 364/231.5 |
| 4,532,554 | 7/1985 | Skala | 358/434 |
| 4,586,086 | 4/1986 | Ohzeki | 358/434 |
| 4,864,412 | 9/1989 | Ueno | 358/436 |

FOREIGN PATENT DOCUMENTS 60-8670 3/1985 Japan .

Primary Examiner—Leo H. Boudreau
Assistant Examiner—Steven P. Fallon
Attorney, Agent, or Firm—Willian Brinks Olds Hofer Gilson & Lione

[57] ABSTRACT

There is disclosed a facsimile apparatus comprising an automatic communication mode for automatically communicating with facsimile apparatuses of plural preregistered subscribers one by one through a communication line. In the facsimile apparatus, a communication controller communicates through the communication line by either transmitting image data therethrough or receiving image data therethrough when either a transmission start signal or a reception signal is detected. When the communication means has communicated with a facsimile apparatus of at least one subscriber completely in the automatic communication mode, a main controller enables a timer to start to count an elapsed time, and interrupts the process of the automatic communication mode temporarily. Thereafter, the main controller enables the communication means for a normal communication other than the automatic communication until the timer has counted up to a predetermined elapsed time.

14 Claims, 14 Drawing Sheets

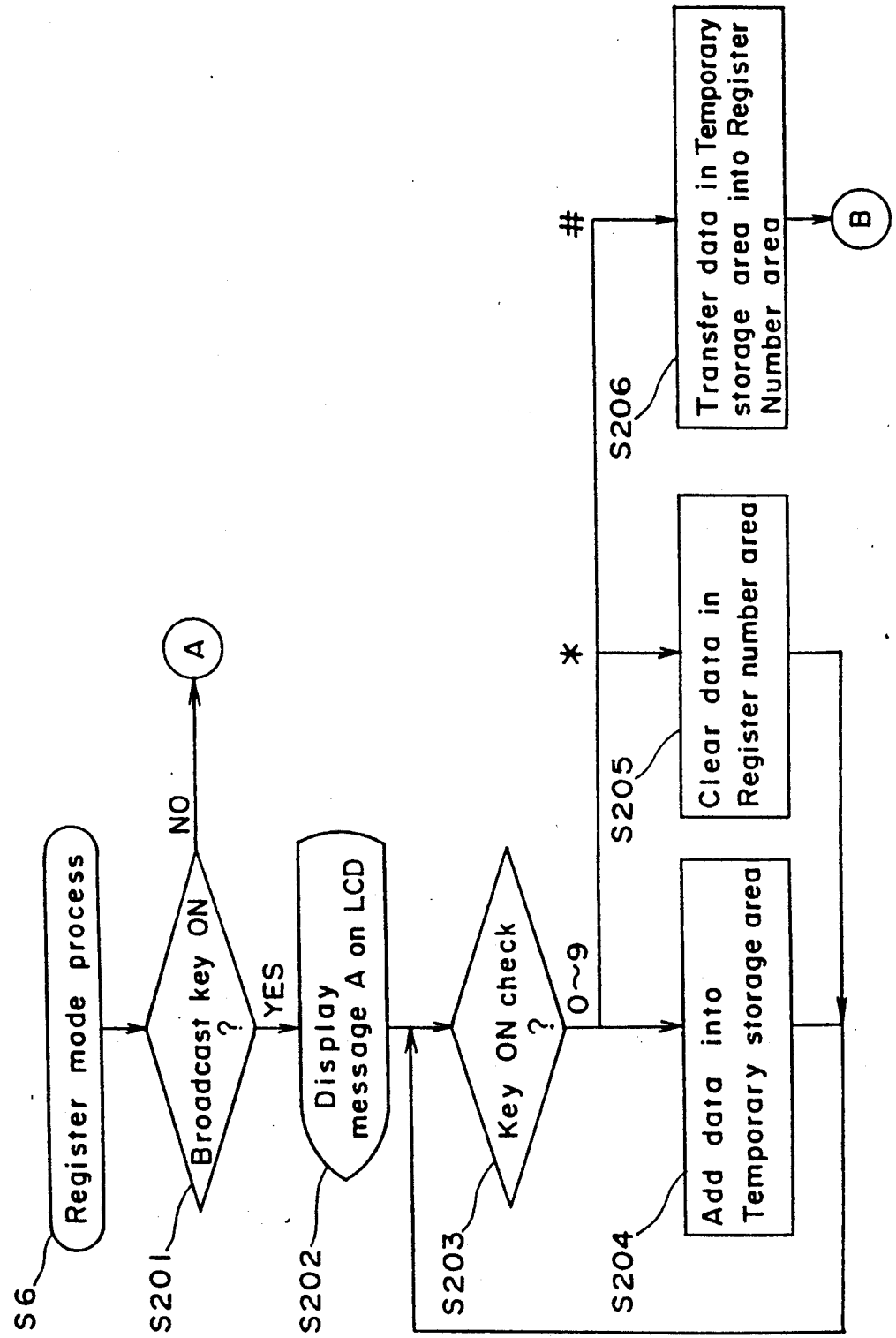

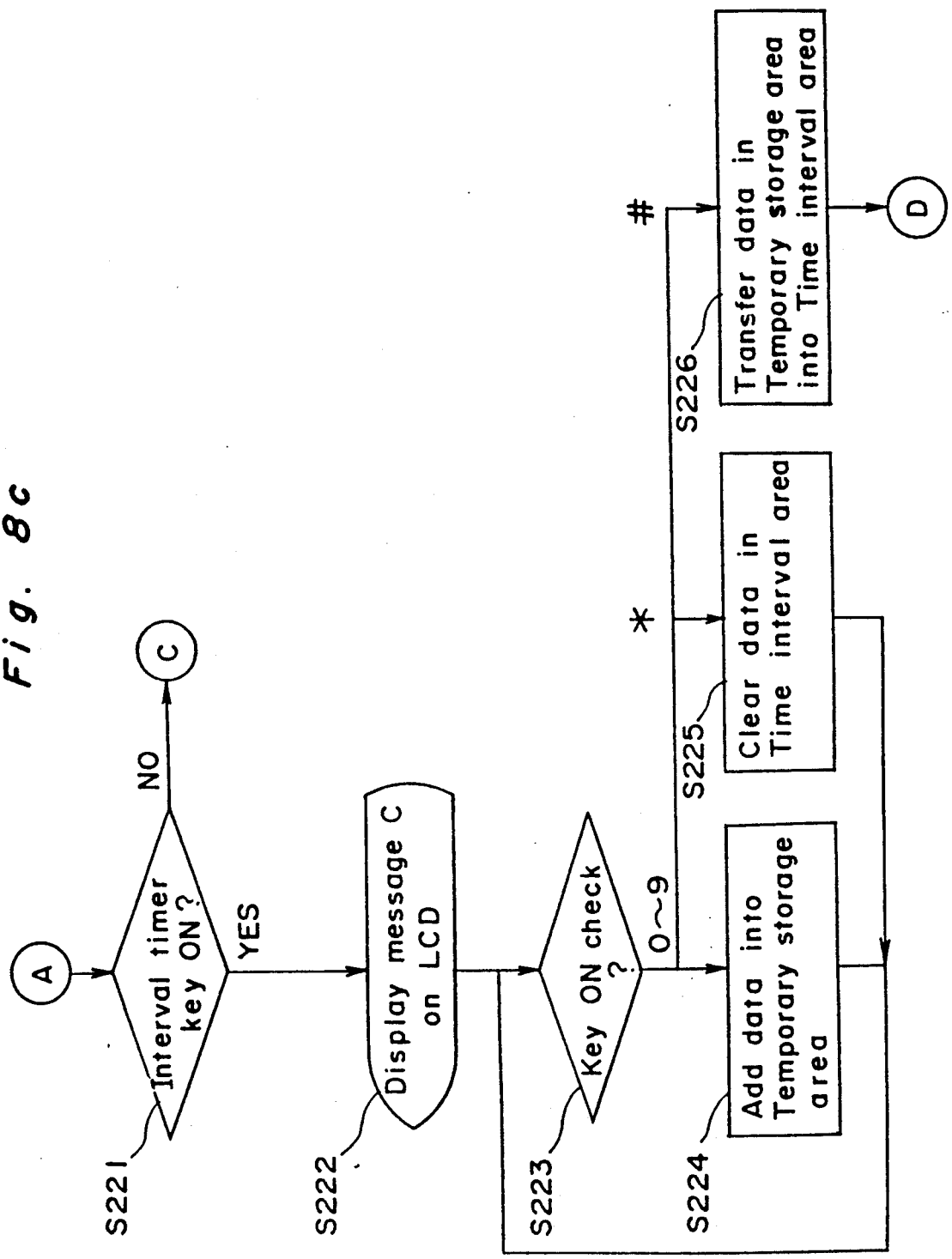

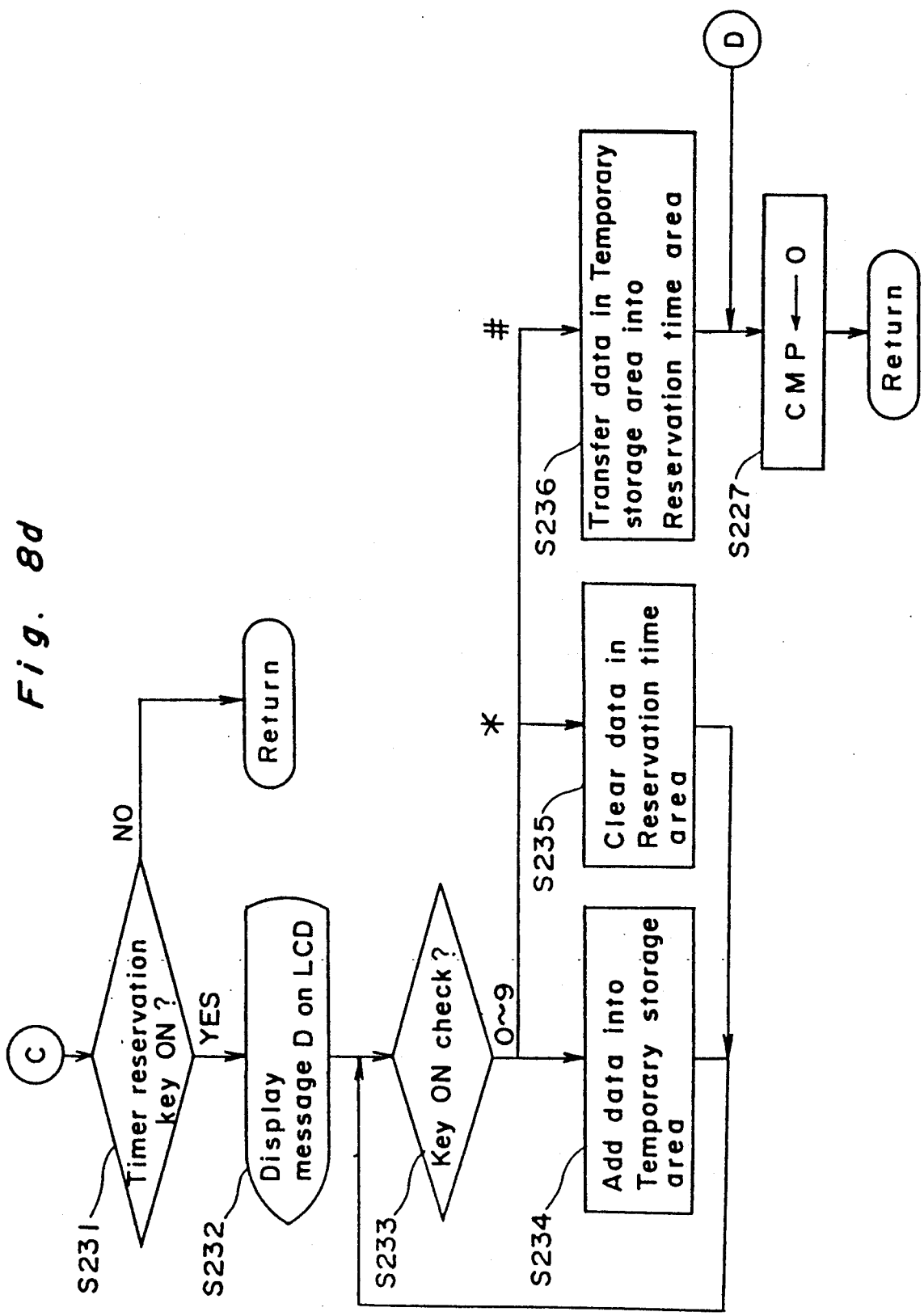

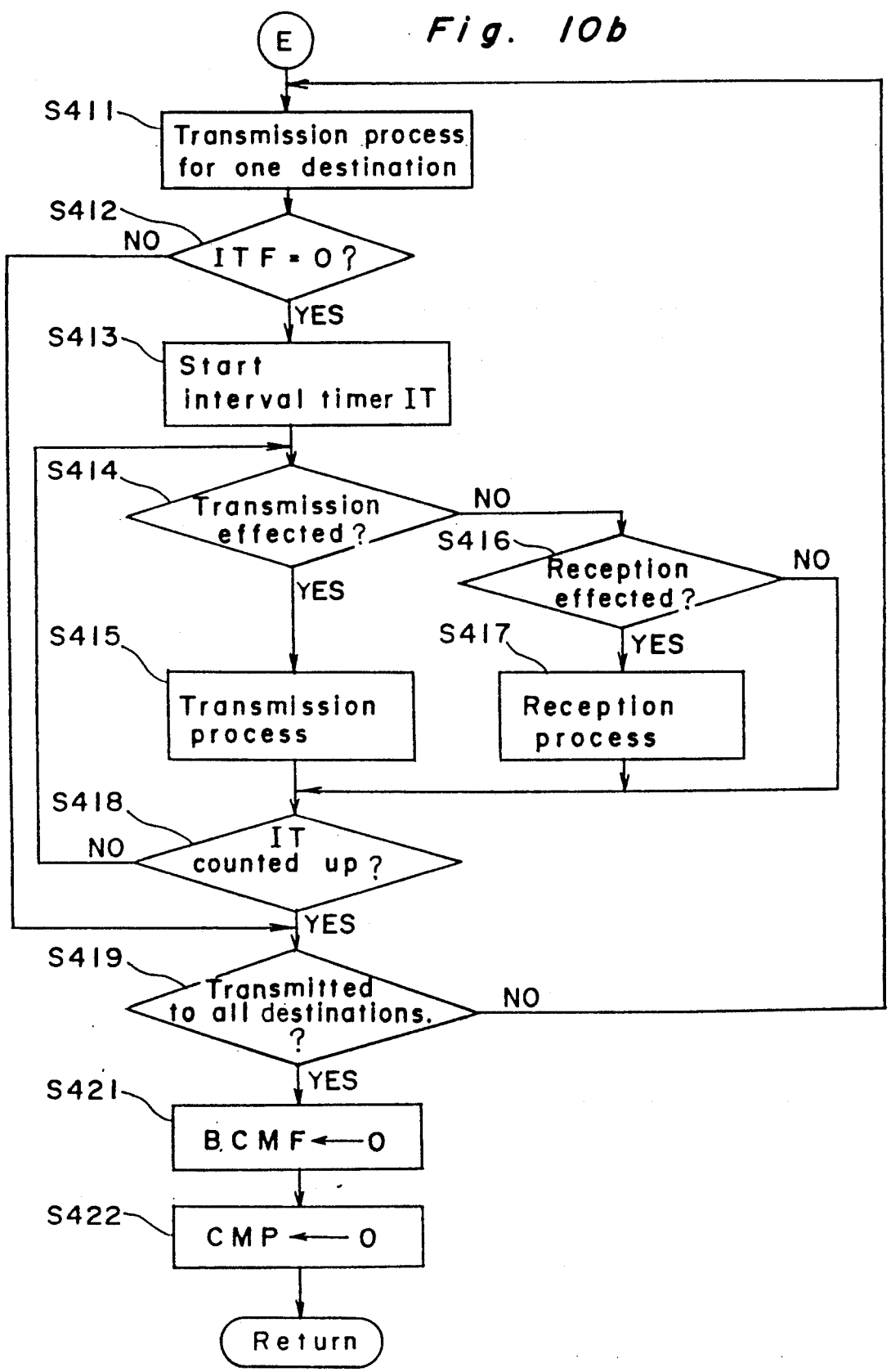

FACSIMILE APPARATUS COMPRISING AUTOMATIC COMMUNICATION MODE

BACKGROUND OF THE INVENTION

1. Field of the Invention

The present invention relates to a facsimile apparatus, more particularly, to a facsimile apparatus comprising an automatic communication mode such as a broadcast communication mode for automatically communicating with facsimile apparatuses of plural preregistered subscribers one by one through a communication line.

2. Description of Related Art

Conventionally, there has been made a facsimile apparatus having an automatic transmission function. As an operation mode of the facsimile apparatus utilizing the automatic transmission function, there is provided a broadcast transmission mode for performing a telephone line connection with plural preregistered facsimile apparatuses through a telephone line and transmitting the same image data thereto one by one, respectively. If a transmission reservation time is set in the broadcast transmission mode, the above process of the broadcast transmission mode is started automatically when the present time coincides with the preset transmission reservation time.

Further, there has been proposed a facsimile network system composed of a host facsimile apparatus having an automatic calling function utilizing the polling method, and plural terminal facsimile apparatuses. In the facsimile network system, the host facsimile apparatus polls plural preregistered terminal facsimile apparatuses automatically, and then, it performs the telephone line connection with only the terminal facsimile apparatuses from which a transmission request signal has been received, and receives image data transmitted therefrom one by one, respectively. Since a telephone line is occupied for a relatively long time by the process of the above automatic calling function utilizing the polling method, the host facsimile apparatus of this type have such a disadvantage that the other transmission process and/or reception process can not be executed.

For example, in the case that a host facsimile apparatus arranged at a head office of a company receives sale information at a time which is transmitted from terminal facsimile apparatuses respectively arranged at 100 branch offices thereof, when it takes three minutes for the host facsimile apparatus to communicate with one terminal facsimile apparatus, the host facsimile apparatus automatically communicates with 100 terminal facsimile apparatuses for a long time of five hours. Then, the telephone line can not be utilized for another use since the telephone line is thus occupied by the above operation. Particularly, in the case that an emergency communication is to be performed, the operator may feel inconvenience thereof.

In order to solve the above problems, there is provided an interruption function in these facsimile apparatuses. In the interruption function thereof, when there is caused an emergency transmission or reception process to be executed, the operator presses an interruption key for interrupting the process of the automatic calling function which is executed at present, and the telephone line is released temporarily. Thereafter, the above emergency transmission or reception process is executed communicating with a facsimile apparatus of a destination subscriber through the telephone line, and then, the interrupted above process of the automatic calling function is executed again.

However, it is necessary for the operator to press the interruption key in order to start the above interruption function, and the process of the automatic calling function can not be interrupted automatically. Particularly, in the case of executing the reception process, since an operator of an originating subscriber can not remotely control the host facsimile apparatus, he can not interrupt the process of the automatic calling function of the host facsimile apparatus.

SUMMARY OF THE INVENTION

An essential object of the present invention is to provide a facsimile apparatus capable of executing another communication process during a process of an automatic communication mode such as the automatic transmission function, the automatic calling function.

Another object of the present invention is to provide a method for transmitting and receiving image data through a communication line, being capable of communicating therethrough for a time interval between respective transmission processes.

A further object of the present invention is to provide a method for transmitting and receiving image data through a communication line, being capable of communicating therethrough for a time interval between respective reception processes.

In order to accomplish the above objects, according to one aspect of the present invention, there is provided a facsimile apparatus comprising:

- detection means for detecting a transmission start signal and a reception start signal;
- communication means for communicating through a communication line by either transmitting image data therethrough or receiving image data therethrough when either said transmission start signal or said reception signal is detected by said detection means;
- timer means for counting an elapsed time;
- automatic communication means for controlling said communication means so as to automatically communicate with facsimile apparatuses of plural preregistered subscribers one by one through said communication line when an automatic communication mode is set; and
- control means for enabling said timer means to start to count the elapsed time and disabling said automatic communication means temporarily when said communication means has communicated with a facsimile apparatus of at least one subscriber completely in said automatic communication mode, and thereafter, enabling said detection means and said communication means until said timer means has counted up to a predetermined elapsed time.

According to another aspect of the present invention, there is provided a method for transmitting and receiving image data through a communication line, including:

- a first step for reading an image and outputting image data of said read image;
- a second step for transmitting image data outputted at said first step to one of plural predetermined destination subscribers through said communication line;
- a third step for detecting that said image data have been transmitted completely at said second step, and for starting a timer to count an elapsed time;

step for permitting transmitting and receiving image data through said communication line until said timer has counted up to a predetermined elapsed time;

a fifth step for detecting that said timer has counted up to said predetermined elapsed time, and for transmitting image data outputted at said first step through said communication line to the next one of plural predetermined destination subscribers except for those to which said image data have been transmitted completely; and a sixth step of repeating said third to fifth steps until said image data have been transmitted to all said plural predetermined destination subscribers.

According to a further aspect of the present invention, there is provided a method for transmitting and receiving image data through a communication line, including:

a first step for receiving image data from one of plural predetermined destination subscribers through said communication line, and for printing an image of said received image data on a piece of printing paper;

a second step for detecting that said image data have been received completely at said first step, and for starting a timer to count an elapsed time;

a third step for permitting transmitting and receiving image data through said communication line until said timer has counted up to a predetermined elapsed time;

a fourth step for detecting that said timer has counted up to said predetermined elapsed time, and for receiving image data through said communication line from the next one of plural predetermined destination subscribers except for those from which said image data have been received completely, and printing an image of said received image data on a piece of printing paper; and a fifth step of repeating said second to fourth steps until said image data have been received from all said plural predetermined destination subscribers.

BRIEF DESCRIPTION OF THE DRAWINGS

These and other objects and features of the present invention will become clear from the following description taken in conjunction with the preferred embodiment thereof with reference to the accompanying drawings, in which:

FIGS. 8a to 8d are flowcharts showing a register mode process of a subroutine which is executed by the CPU of the main controller shown in FIG. 4;

FIGS. 10a and 10b are flowcharts showing a broadcast communication mode process of a subroutine which is executed by the CPU of the main controller shown in FIG. 4.

DETAILED DESCRIPTION OF THE PREFERRED EMBODIMENT

A facsimile apparatus of a preferred embodiment according to the present invention will be described below in the order of the following items with reference to the attached drawings.

Figure 1:
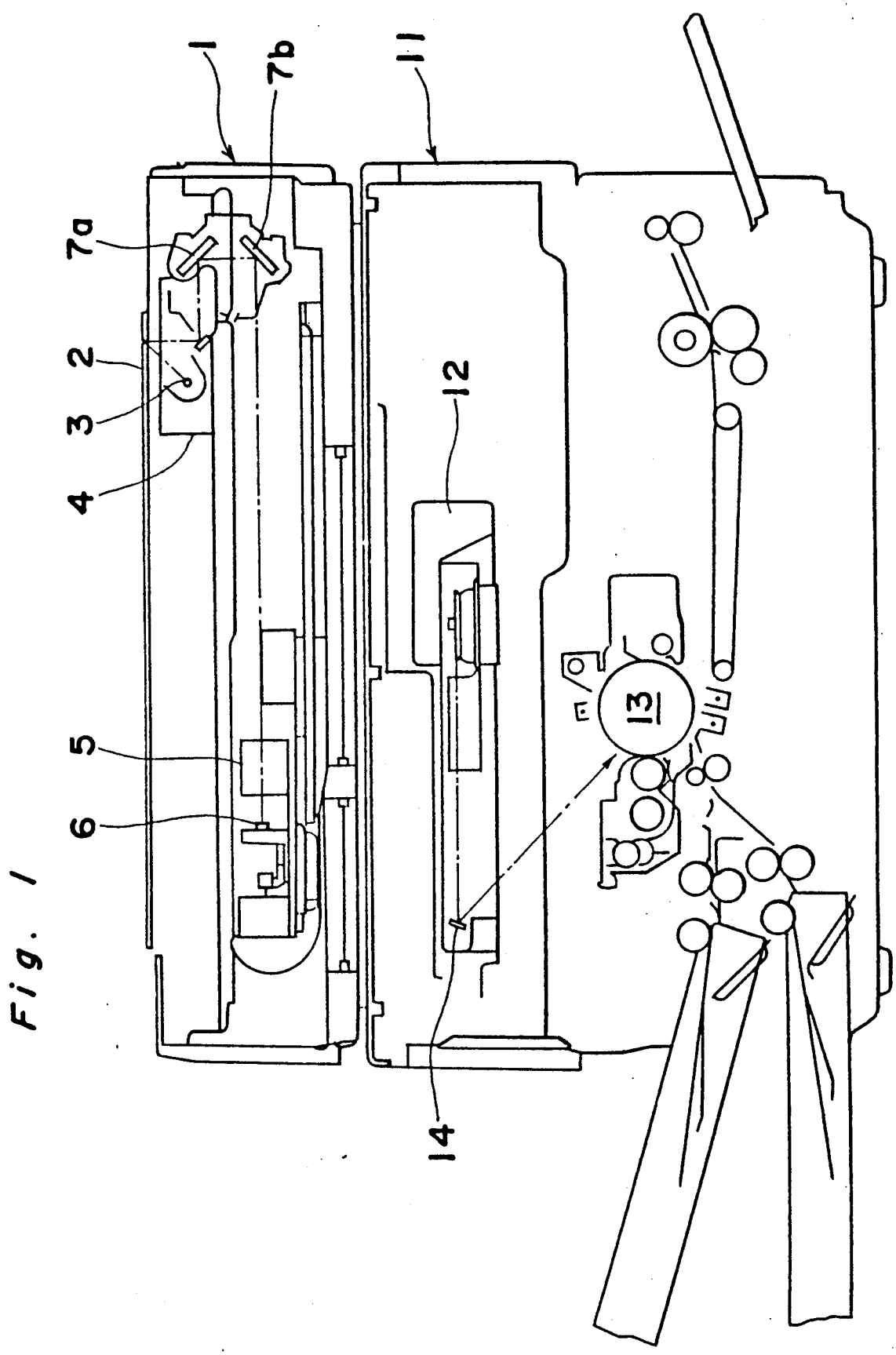
FIG. 1 is a schematic cross sectional view showing a facsimile apparatus of a preferred embodiment according to the present invention.

(a) Composition of Facsimile apparatus
(b) Action of Facsimile apparatus
   (b-1) Main routine
   (b-2) Input and output process
   (b-3) Standby mode process
   (b-4) Register mode process
   (b-5) Broadcast communication mode process
(c) Modifications (a) Composition of Facsimile apparatus FIG. 1 is a schematic cross sectional view showing a facsimile apparatus of the preferred embodiment according to the present invention.

Referring to FIG. 1, the facsimile apparatus comprises an image reader section 1 for reading an image (referred to as a document image hereinafter) of a document set on a document table 2 and transmitting image data of the document image to a facsimile apparatus of a destination subscriber through a telephone line, and a printer section 11 for printing a document image of image data received through the telephone line from a facsimile apparatus of an originating subscriber.

In the image reader section 1, the document set on the document table 2 is scanned by a moving scanner 4 projecting light from a light source 3 onto the document. Light reflected from the document is reflected by mirrors 7a and 7b, and is incident onto a linear CCD image sensor 6 having eight pixels/mm through a focus lens 5 so that the document image is formed thereon. The CCD image sensor 6 reads the document image and outputs an electric image signal. As described in detail later, the electric image signal is converted into digital image data, and the converted digital image data are binarized into binary image data.

The printer section 11 comprises an electrophotographic laser printer which is well known to those skilled in the art. In the printer section 11, a laser diode of a laser optical system 12 emits laser light according to image data received from a facsimile apparatus of an originating subscriber so as to project the laser light onto a photoconductive drum 13 through a mirror 14. The laser light forms an electrostatic latent image of the image data on the photoconductive drum 13, and the electrostatic latent image is developed with toner so as to form a toner image thereon. The toner image is transferred onto a piece of printing paper and is fixed thereon, and then, the printing paper on which the toner image is formed is discharged.

The detailed description of the above reading operation and the printing operation is omitted in the specification since they are similar to that of a conventional laser copying machine.

Figure 2:
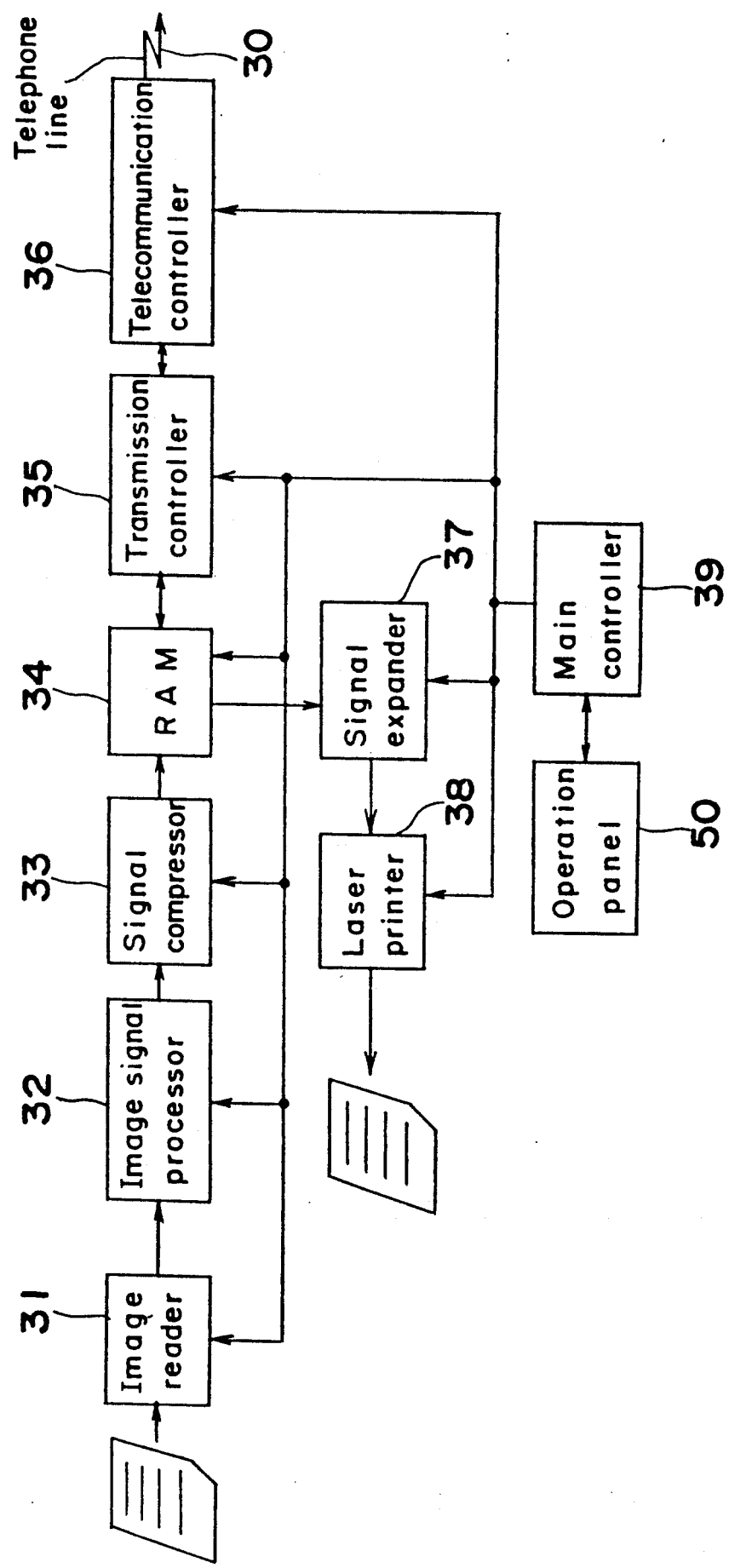
FIG. 2 is a block diagram showing a composition of the facsimile apparatus shown in FIG. 1.

FIG. 2 is a block diagram showing the facsimile apparatus shown in FIG. 1.

Referring to FIG. 2, an image reader 31 including the CCD image sensor 6 shown in FIG. 1 reads the document image and outputs an electric image signal of the document image, and then, an image signal processor 32 binarizes the electric image signal by, for example, the dither method so as to convert it into binary image data. Thereafter, a signal compressor 33 encodes the binary image data by either the modified READ coding method or the modified Huffman coding method, and stores the encoded image data in a random access memory (referred to as a RAM hereinafter) 34.

Upon transmitting image data, a telecommunication controller 36 performs a predetermined telephone line connection through the telephone line 30 with a facsimile apparatus of a destination subscriber. Thereafter, a transmission controller 35 reads out the image data stored in the RAM 34, modulates a carrier signal according to the read image data, and then, transmits the modulated carrier signal as a facsimile image signal to the facsimile apparatus of the destination subscriber through the telecommunication controller 36 and the telephone line 30.

Upon receiving image data, when the telecommunication controller 36 receives an incoming signal from an exchange (not shown) which is connected through the telephone line 30, it performs a predetermined telephone line connection with a facsimile apparatus of an originating subscriber through the telephone line 30 and the exchange. Thereafter, the transmission controller 35 receives a facsimile image signal transmitted from the facsimile apparatus of the originating subscriber, demodulates it so as to convert it into image data, and stores the converted image data in the RAM 34. Thereafter, an signal expander 37 reads out the image data stored in the RAM 34, and decodes the image data so as to convert it into an image signal. A laser printer 38 prints an image of the received image data on a piece of printing paper according to the image signal inputted from the signal expander 37.

A main controller 39 controls the above operation of the facsimile apparatus according to instructions of an operator inputted using an operation panel 50, and also outputs status information of the facsimile apparatus and instructions for the operator to the operation panel 50 so as to display them thereon.

The facsimile apparatus of the preferred embodiment comprises a normal communication mode for transmitting image data to a facsimile apparatus of a destination subscriber reading the document image, and for receiving image data from a facsimile apparatus of an originating subscriber, and a broadcast communication mode for transmitting image data of the same document to facsimile apparatuses of plural destination subscribers which have been registered previously. The facsimile apparatus is characterized in that the main controller 39 executes a transmission process of the image data to each destination subscriber at a time interval which is instructed by the operator in the above broadcast communication mode, wherein the aforementioned time interval is defined in the specification as a time interval between a timing when the previous transmission process is completed and a timing when the next transmission process is started. The above operation of plural transmission processes executed at a time interval is referred to as an interval operation of the broadcast communication mode hereinafter.

Figure 3:
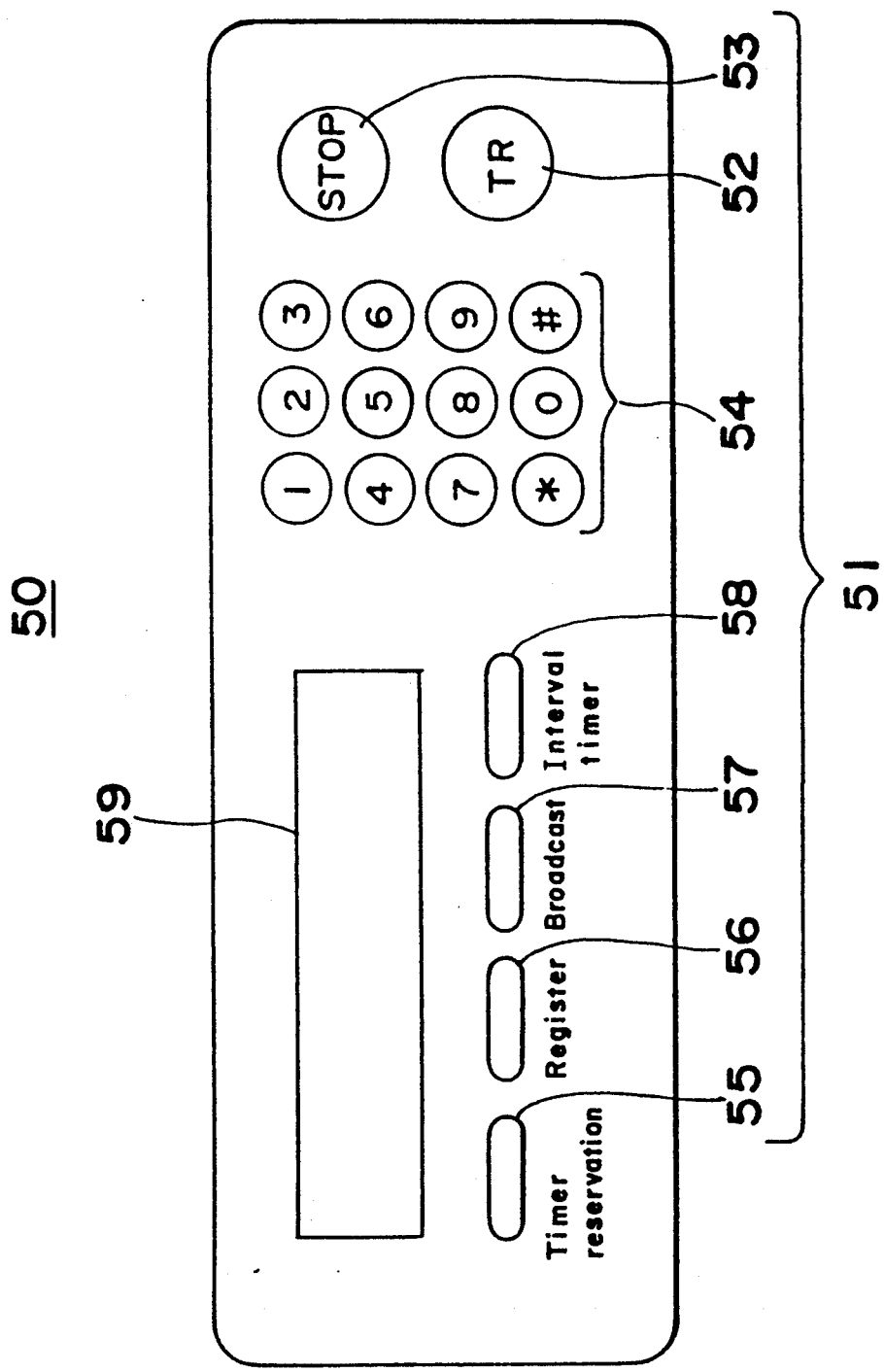
FIG. 3 is a top plan view showing an operation panel shown in FIG. 2.

FIG. 3 is a top plan view showing the operation panel 50 shown in FIG. 2.

Referring to FIG. 3, the operation panel 50 comprises a key matrix unit 51 for inputting various kinds of information and a liquid crystal display (referred to as an LCD hereinafter) 59 for displaying various kinds of messages for the operator as shown in FIGS. 9a to 9d.

The key matrix unit 51 comprises a transmission (TR) key 52 for starting the above reading operation of the image reader 31 and executing the transmission process of image data of the read document image in the normal communication mode, and also starting the above reading operation of the image reader 31 in the broadcast communication mode, a STOP key 53 for interrupting the reading operation and the transmission process, and a set of ten keys 54 for telephones composed of keys "0" to "9", "*" and "#" which are used upon setting, clearing and registering register numbers of destination subscribers, telephone numbers thereof, a time interval value corresponding to a practical time interval between respective transmission processes executed in the broadcast communication mode, and a reservation time at which the transmission process is to be started in the broadcast communication mode.

The key matrix unit 51 further comprises a timer reservation key 55 for selecting a timer reservation process for transmitting image data at a reservation time in order to register the reservation time after pressing a register key 56, and the register key 56 for selecting the register mode for registering a reservation time, a time interval value, and a telephone number of a destination subscriber in the broadcast communication mode.

Furthermore, the key matrix unit 51 comprises a broadcast key 57 for registering a register number, a telephone number and a reservation time of a destination subscriber in the broadcast communication mode after pressing the register key 56, and also for setting the broadcast communication mode, and an interval timer key 58 for registering a time interval value in the broadcast communication mode after pressing the register key 56. It is to be noted that, if "0" is inputted as the time interval value using a set of ten keys 54, the aforementioned interval operation of the broadcast communication mode is not executed. For example, if "20" is inputed as the time interval value using a set of ten keys 54, a practical time interval between respective transmission processes executed in the broadcast communication mode is set at 20 seconds.

Figure 4:
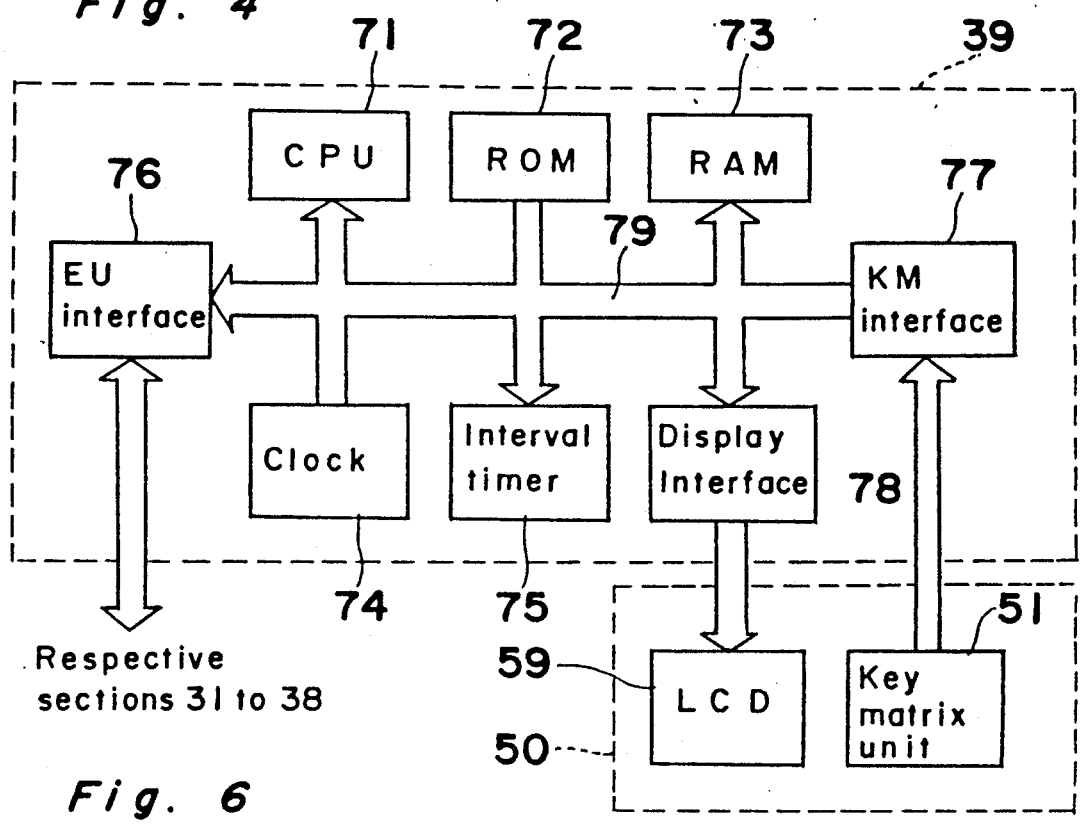
FIG. 4 is a block diagram showing a main controller shown in FIG. 2.

FIG. 4 shows the main controller 39 shown in FIG. 2.

Referring to FIG. 4, the main controller 39 comprises a central processing unit (referred to as a CPU hereinafter) 71 for controlling the operation of the facsimile apparatus shown in FIGS. 1 and 2, a read only memory (referred to as a ROM hereinafter) 72 for storing a system program of the CPU 71 and data required for executing the system program, a RAM 73 being used as a working area for storing parameters, flags and various kinds of information therein, a clock 74 for counting a present time, an interval timer 75 (referred to as an IT in the drawings) for counting a value and outputting an interruption signal to the CPU 71 when the interval timer 75 has counted up to a preset time interval value, an external unit interface 76 connected to respective sections 31 to 38 shown in FIG. 2, a key matrix interface 77 connected to the key matrix unit 51, and a display interface 78 connected to the LCD 59, which are connected to each other through an internal bus 79.

It is to be noted that, when one of the keys 52 to 58 of the key matrix unit 51 is pressed, namely, it has been turned on after it is turned off, a key signal corresponding to the pressed key is inputted to the CPU 71 through the key matrix interface 77. It is described hereinafter in the specification that "a key has been turned on", when the key signal has been inputted to the CPU 71.

Figure 11:
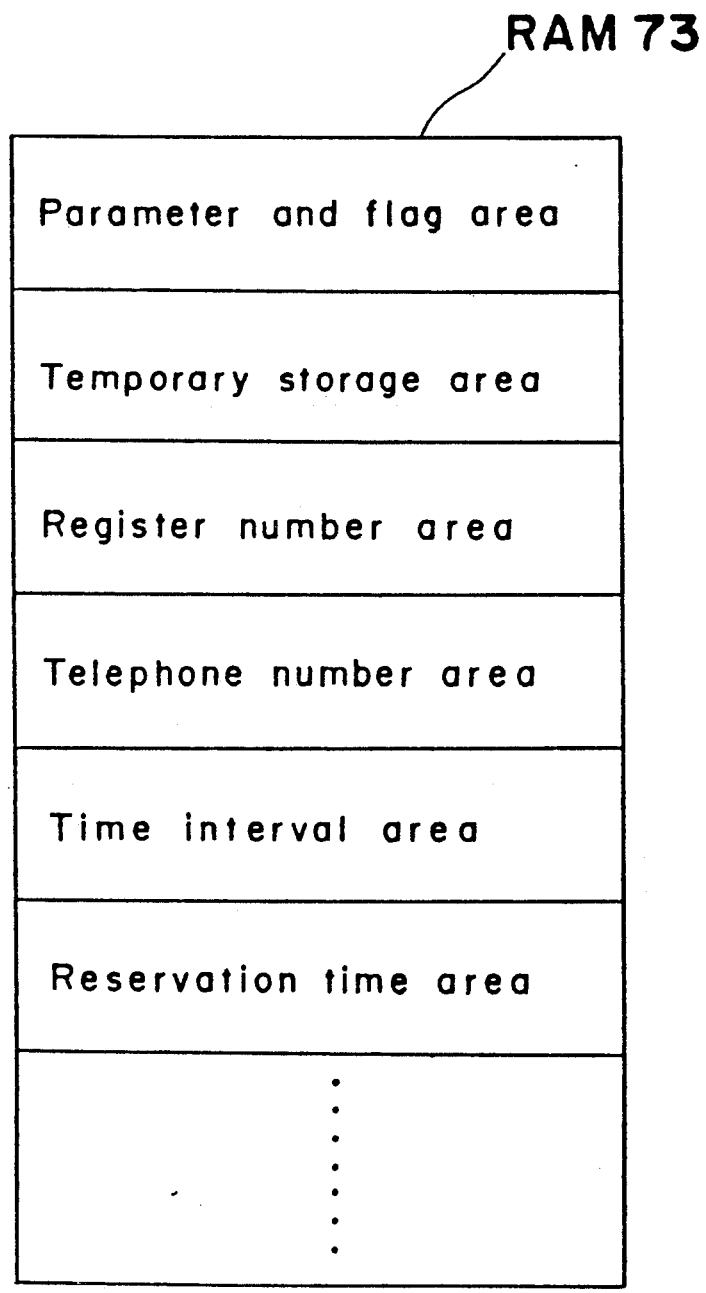
FIG. 11 is a memory map of a RAM shown in FIG. 4.

FIG. 11 shows a memory map of the RAM 73 shown in FIG. 4.

Figure 5:
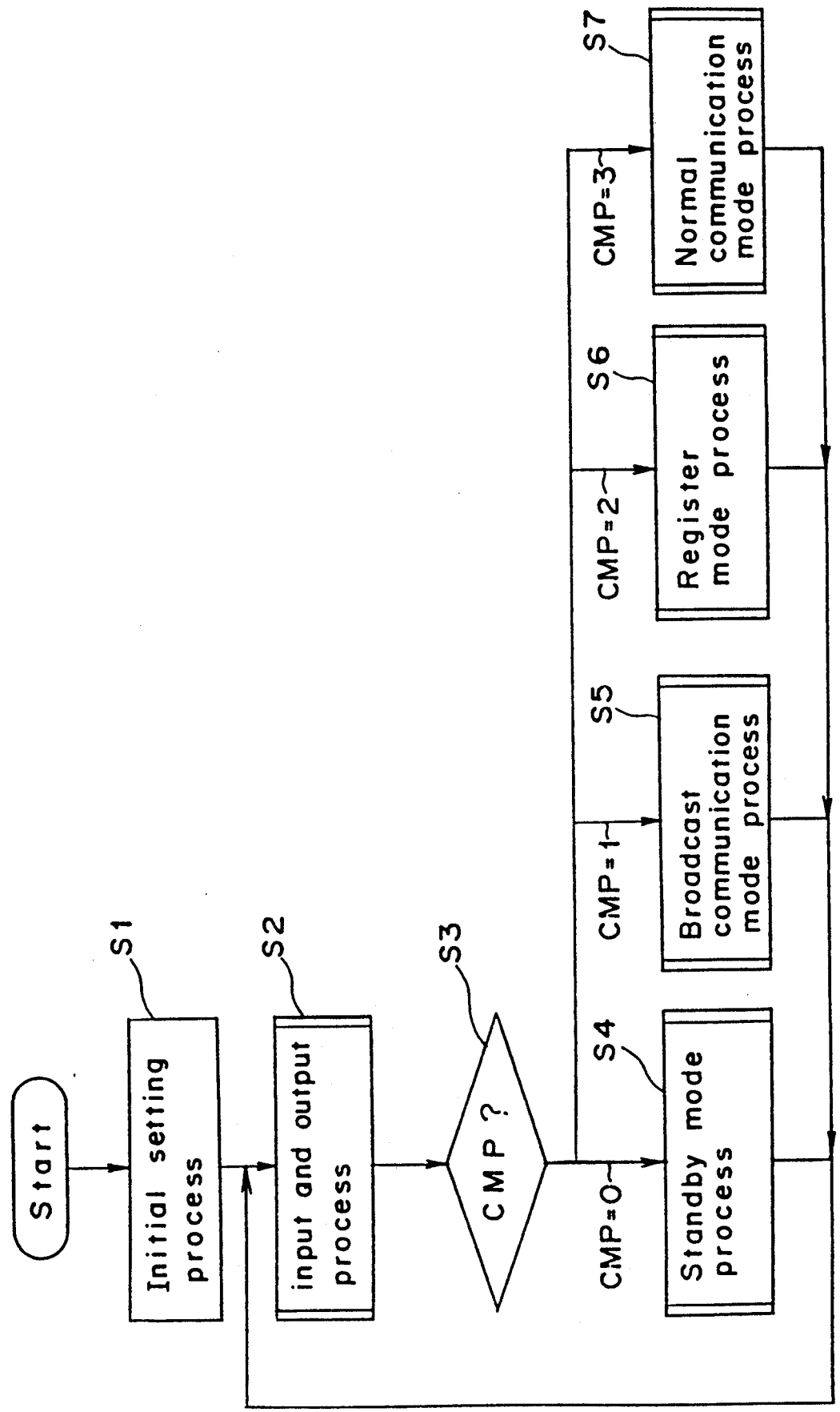
FIG. 5 is a flowchart showing a main routine which is executed by a CPU of the main controller shown in FIG. 4.

Referring to FIG. 11, a memory area of the RAM 73 comprises:

(1) a parameter and flag area for storing the following parameter and flags required for executing the system program stored in the ROM 72:

CMP: a control mode parameter for indicating preset one of operation modes of the facsimile apparatus shown in FIG. 5, ITF: an interval timer flag for indicating whether or not the interval timer key 58 has been turned on, and BCMF: a broadcast communication mode flag for indicating whether or not the broadcast communication mode has been set;

(2) a temporary storage area for temporarily storing various kinds of data such as a register number of a destination subscriber, a telephone number thereof, a time interval as defined above, a reservation time;

(3) a register number area for storing register numbers of destination subscribers;

(4) a telephone number area for storing telephone numbers of destination subscribers corresponding to the register numbers;

(5) a time interval area for storing a time interval value in the broadcast communication mode; and (6) a reservation time area for storing reservation times of destination subscribers corresponding to the register numbers.

(b) Action of Facsimile apparatus

In the facsimile apparatus of the preferred embodiment, the aforementioned broadcast communication mode is set when the broadcast key 57 is turned on, and thereafter, at a reservation time which has been registered using the timer reservation key 55, the same image data are transmitted one by one to the facsimile apparatuses of the destination subscribers which have been registered previously.

The features of the present preferred embodiment are as follows.

After the interval timer 75 is started to count a value at step S413 of FIG. 10b when the transmission process of image data for one destination subscriber is completed at step S411, the CPU 71 waits until the interval timer 75 has counted up to a preset time interval value (Yes at step S418), and then the CPU 71 executes the transmission process of the image data for the next destination subscriber at step S411.

Accordingly, since the telephone line 30 is released for a predetermined time interval when the destination subscribers are switched over from one to another, there can be executed another transmission process in the normal communication mode for transmitting image data other than those transmitted in the broadcast communication mode at step S415 or S430, and/or another reception process in the normal communication mode at step S417 or S432. Namely, the other transmission and/or reception processes can be executed even in the broadcast communication mode, and the facsimile apparatus of the preferred embodiment has such an advantage that it can perform an emergency communication with the other subscribers.

(b-1) Main routine

FIG. 5 is a flowchart showing a main routine which is executed by the CPU 71 of the main controller 39.

Figure 6:
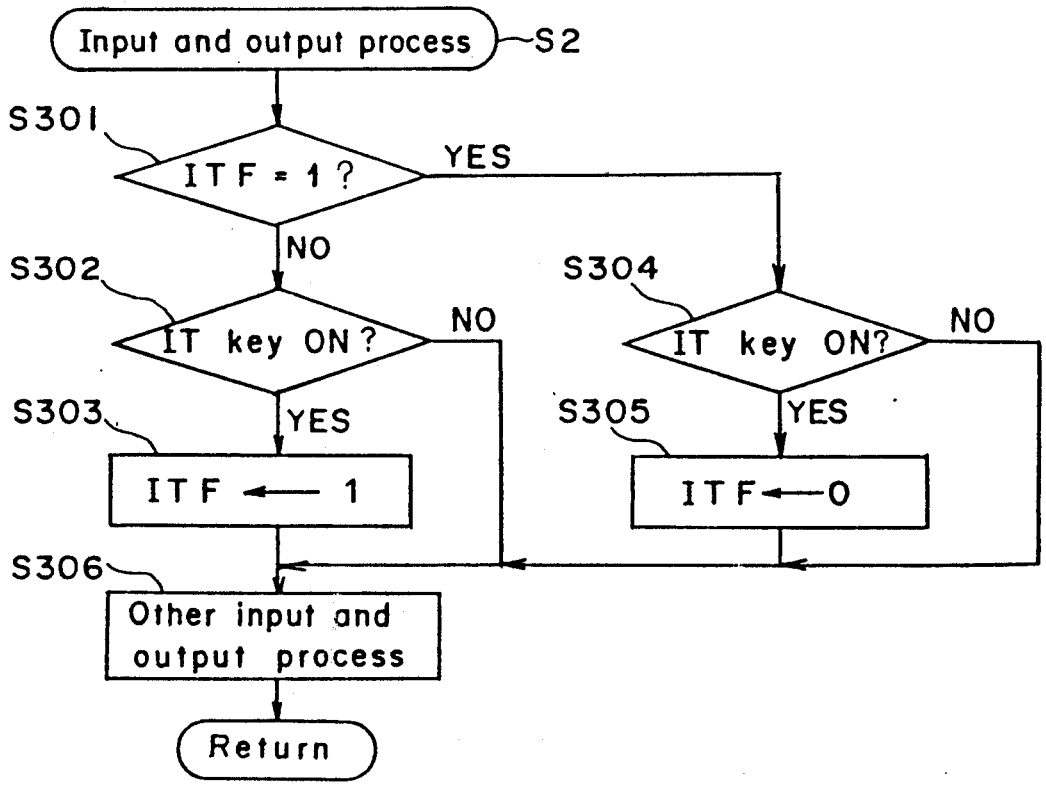
FIG. 6 is a flowchart showing an input and output process of a subroutine which is executed by the CPU of the main controller shown in FIG. 4.

Referring to FIG. 5, when the facsimile apparatus is turned on, first of all, the CPU 71 is reset, and there is executed an initial setting process for initializing the parameter CMP and the flags ITF and BCMF so as to reset them to zero at step S1. Thereafter, an input and output process is executed at step S2 as shown in FIG. 6, wherein it is judged whether or not the interval timer key 58 has been turned on, namely, it has been selected whether or not the interval timer 75 is to be started. Thereafter, the control mode parameter CMP is checked at step S3, and then, the program flow branches to either step S4, S5, S6 or S7.

Figure 7:
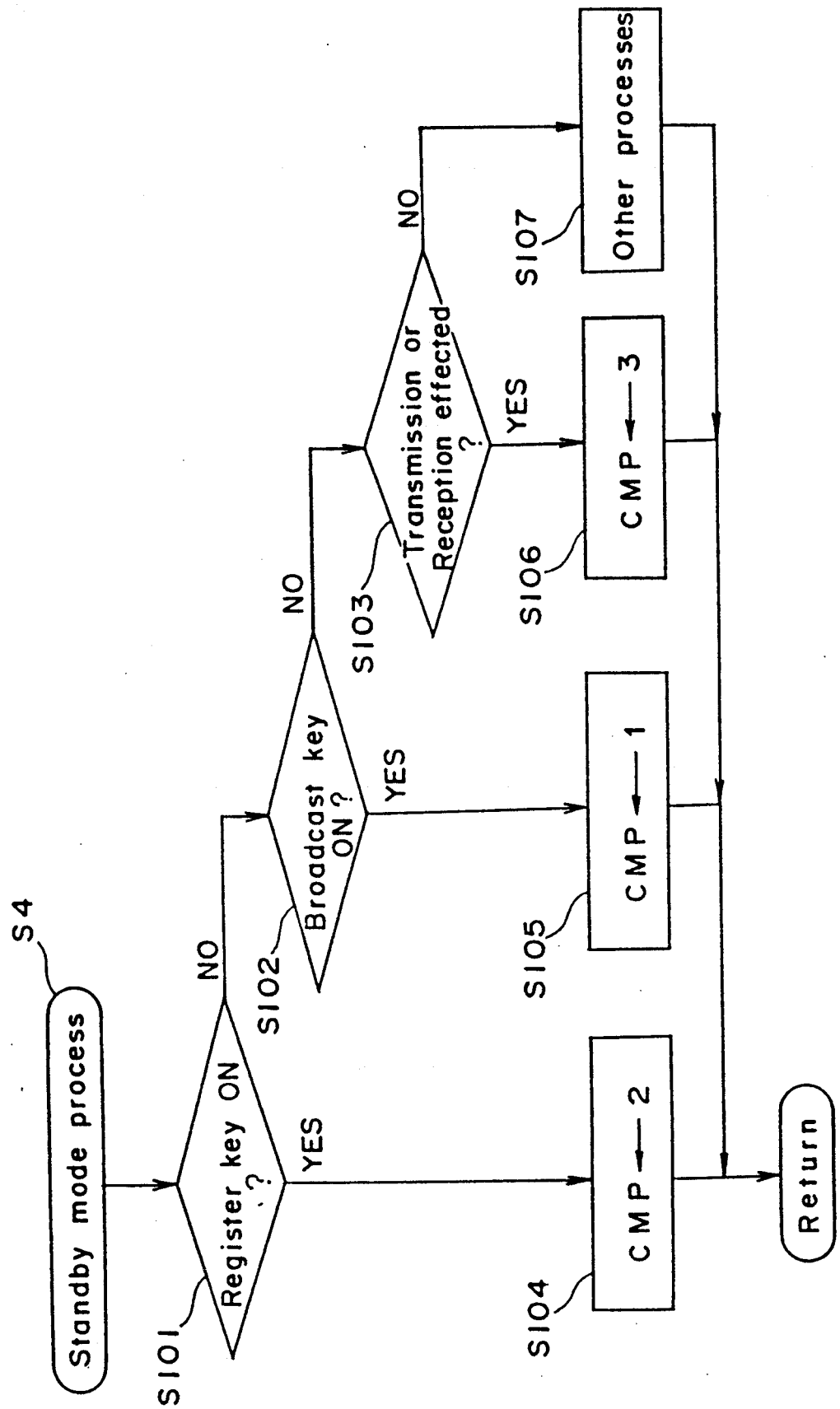
FIG. 7 is a flowchart showing a standby mode process of a subroutine which is executed by the CPU of the main controller shown in FIG. 4.

When the control mode parameter CMP has been set at zero at step S3, the program flow goes to step S4, there is executed a standby mode process for executing predetermined processes according to various kinds of keys 52 to 58 except for a set of ten keys 54 as shown in FIG. 7, and then, the program flow goes to step S2.

Figure 10A:
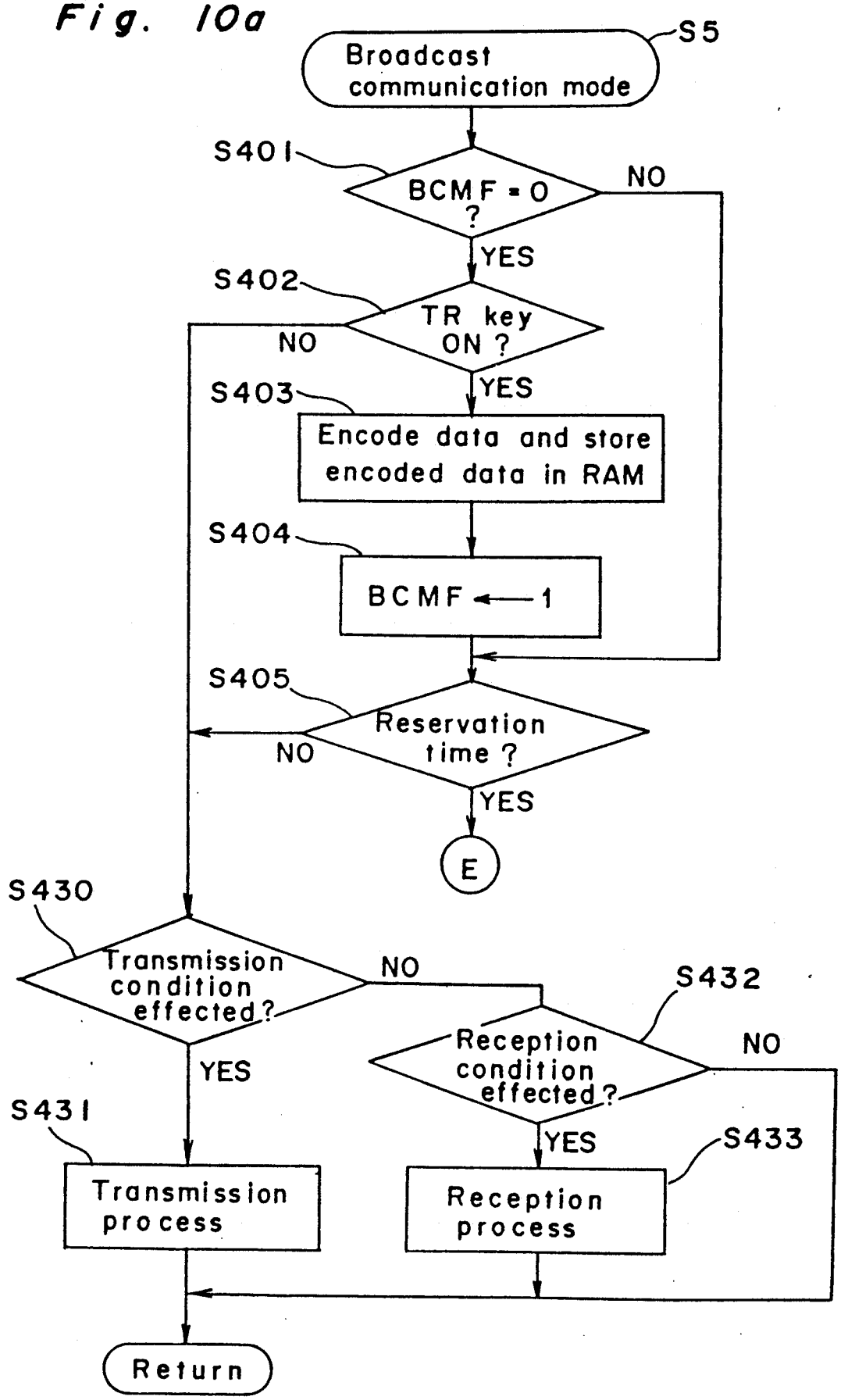

When the control mode parameter CMP has been set at one at step S3, the program flow goes to step S5, there is executed the broadcast communication mode process for executing predetermined processes as shown in FIGS. 10a and 10b, and then, the program flow goes back to step S2.

When the control mode parameter CMP has been set at two at step S3, the program flow goes to step S6, there is executed a register mode process for setting a register number of a destination subscriber, a telephone number thereof, a time interval value in the broadcast communication mode, and a reservation time when the first transmission process is to be started in the broadcast communication mode, as shown in FIGS. 8a to 8d, and then, the program flow goes back to step S2.

When the control mode parameter CMP has been set at three at step S3, the program flow goes to step S7, there is executed a normal communication mode for executing a transmission process for a destination subscriber when a document is set on the document table 2 and the transmission key 52 is turned on, and for executing a reception process when an incoming signal is received from the exchange, and then, the program flow goes back to step S2.

(b-2) Input and output process

FIG. 6 shows the input and output process (step S2) of a subroutine shown in FIG. 5.

Referring to FIG. 6, first of all, it is judged whether or not the interval timer flag ITF has been set at one at step S301. If the interval timer flag ITF has been set at zero (No at step S302), the program flow goes to step S302. On the other hand, if the interval timer flag ITF has been set at one (Yes at step S302), the program flow goes to step S304. At steps S302 and S304, it is judged whether or not the interval timer key 58 has been turned on.

If the interval timer key 58 has been turned on (Yes at step S302), the interval timer flag ITF is is reset to zero at step S305, and then, the program flow goes to step S306. Otherwise (No at step S302), the program flow goes to step S306, directly.

At step S306, there are executed the other input and output processes for the other keys and sensors, and then, the program flow returns.

(b-3) Standby mode process

FIG. 7 shows the standby mode process (step S4) of a subroutine shown in FIG. 5.

Referring to FIG. 7, it is judged whether or not the register key 56 has been turned on at step S101, and it is judged whether or not the broadcast key 57 has been turned on at step S102. If the register key 56 has been turned on (Yes at step S101), the control mode parameter CMP is set at two at step S104, and then, the program flow returns. If the broadcast key 57 has been turned on (Yes at step S102), the control mode parameter CMP is set at two at step S105, and then, the program flow returns.

If the register key 56 has not been turned on (No at step S101) and the broadcast key 57 has not been turned on (No at step S102), it is judged whether or not the transmission condition and the reception condition have been effected at step S103. Namely, if a document having image data to be transmitted to a destination subscriber has been set on the document table 2 and the transmission key 52 has been turned on without turning on the broadcast key 57 (Yes at step S103), or if an incoming signal has been received from the exchange and there has been performed the telecommunication line connection with a facsimile apparatus thereof (Yes at step S103), the control mode parameter CMP is set at three at step S106, and then, the program flow returns.

On the other hand, if the register key 56 has not been turned on (No at step S101), the broadcast key 57 has not been turned on (No at step S102), and the transmission condition and the reception condition have not been effected (No at step S103), the other predetermined processes are executed at step S107, and then, the program flow returns.

(b-4) Register mode process

FIGS. 8a to 8d show the register mode process (step S6) of a subroutine shown in FIG. 5 for registering the aforementioned transmission conditions in the broadcast communication mode. In the register mode process, when the broadcast key 57 is pressed, there are registered a register number of a destination subscriber to which image data are to be transmitted, and a telephone number thereof. When the interval timer key 58 is pressed, there is registered an time interval value described in detail above. When the timer reservation key 55 is pressed, there is registered a reservation time in the broadcast communication mode.

Referring to FIG. 8a, first of all, it is judged whether or not the broadcast key 57 has been turned on at step S201. If the broadcast key 57 has been turned on (Yes at step S201), the program flow goes to step S202. On the other hand, if the broadcast key 57 has not been turned on (No at step S201), the program flow goes to step S221 of FIG. 8c.

Figure 9A:
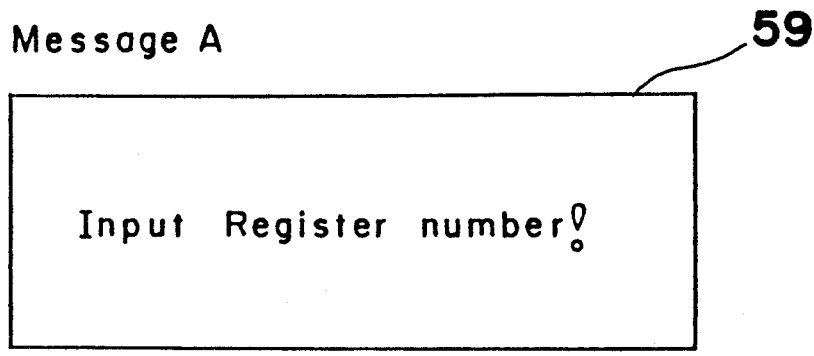
FIGS. 9a to 9d are top plan views of various kinds of messages for the operator which are displayed on an LCD of the operation panel shown in FIG. 3.

At step S202, there is displayed a message A "Input Register number !" shown in FIG. 9a on the LCD 59 so as to instruct the operator to input a register number of a destination subscriber to which image data are to be transmitted, and then, it is judged whether or not one of a set of ten keys 54 of the key matrix unit 51 has been turned on at step S203.

If one of the number keys "0" to "9" of a set of ten keys 54 has been turned on at step S203, data corresponding to the turned on number key are stored in the temporary storage area of the RAM 73 at step S204 so as to add them to data having been stored therein already, and then, the program flow goes back to step S203. If the key "*" of a set of ten keys 54 has been turned on at step S203, data stored in the register number area of the RAM 73 are cleared at step S205, and then, the program flow goes back to step S203. If the key "#" of a set of ten keys 54 has been turned on at step S203, data stored in the temporary storage area of the RAM 73 are transferred into the register number area thereof and are stored therein, and data stored in the temporary storage area of the RAM 73 are cleared at step S206. Thereafter, the program flow goes to step S211 of FIG. 8b.

Figure 8B:
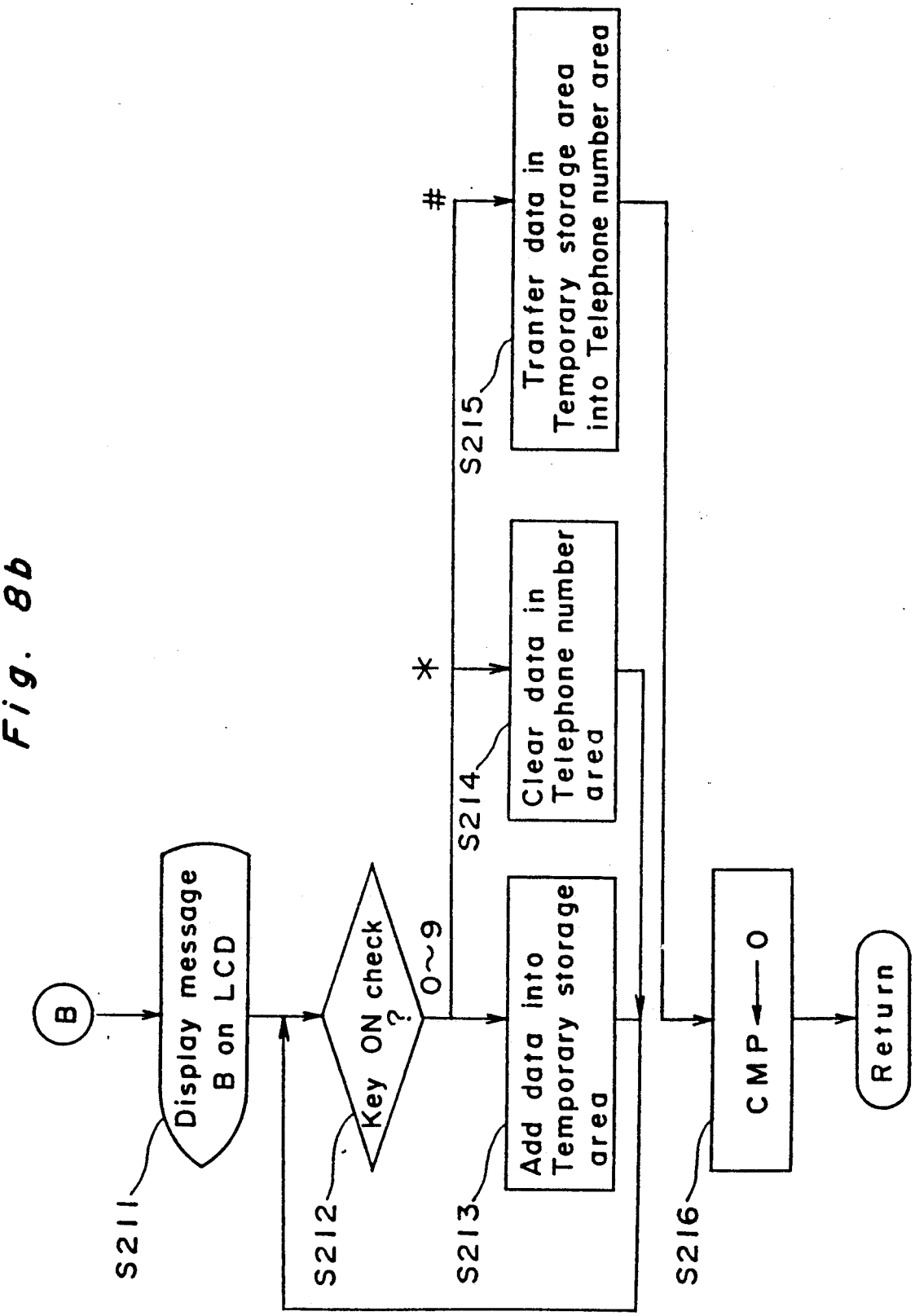
Figure 9B:
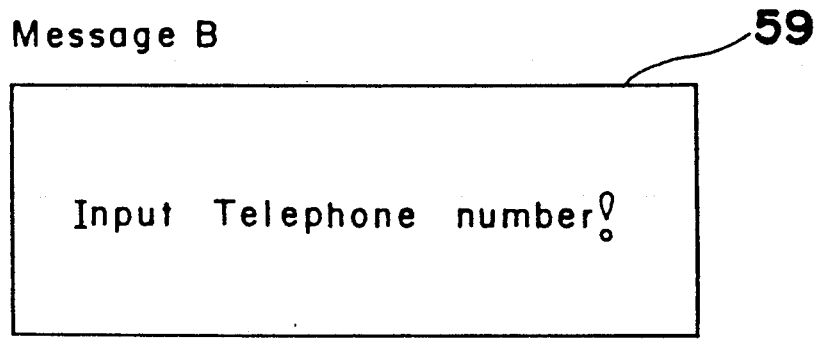

Referring to FIG. 8b, there is displayed a message B "Input Telephone number !" shown in FIG. 9b on the LCD 59 at step S211 so as to instruct the operator to input a telephone number of the destination subscriber corresponding to the register number inputted at steps S202 to S206, and then, it is judged whether or not one of a set of ten keys 54 of the key matrix unit 51 has been turned on at step S212.

If one of the number keys "0" to "9" of a set of ten keys 54 has been turned on at step S212, data corresponding to the turned on number key are stored in the temporary storage area of the RAM 73 at step S213 so as to add them to data having been stored therein already, and then, the program flow goes back to step S212. If the key "*" of a set of ten keys 54 has been turned on at step S212, data stored in the telephone number area of the RAM 73 are cleared at step S214, and then, the program flow goes back to step S212. If the key "#" of a set of ten keys 54 has been turned on at step S212, data stored stored in the temporary storage area of the RAM 73 are transferred into the telephone number area thereof are stored therein, and data stored in the temporary storage area of the RAM 73 are cleared at step S215. Thereafter, the program flow goes to step S216.

At step S216, the control mode parameter CMP is reset to zero, and then, the program flow returns.

Referring to FIG. 8c, it is judged whether or not the interval timer key 58 has been turned on at step S221. If the interval timer key 58 has been turned on (Yes at step S221), the program flow goes to step S222. On the other hand, if the interval timer key 58 has not been turned on (No at step S221), the program flow goes to step S231 of FIG. 8d.

Figure 9C:
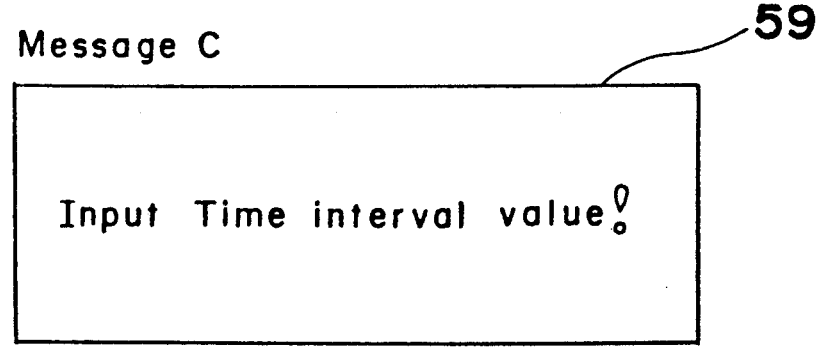

At step S222, there is displayed a message C "Input Time interval value !" shown in FIG. 9c on the LCD 59 so as to instruct the operator to input a time interval value in the broadcast communication mode, and then, it is judged whether or not one of a set of ten keys 54 of the key matrix unit 51 has been turned on at step S223.

If one of the number keys "0" to "9" of a set of ten keys 54 has been turned on at step S223, data corresponding to the turned on number key are stored in the temporary storage area of the RAM 73 at step S224 so as to add them to data having been stored therein already, and then, the program flow goes back to step S223. If the key "*" of a set of ten keys 54 has been turned on at step S223, data stored in the time interval area of the RAM 73 are cleared at step S225, and then, the program flow goes back to step S223. If the key "#" of a set of ten keys 54 has been turned on at step S223, data stored stored in the temporary storage area of the RAM 73 are transferred into the time interval area thereof and are stored therein, and data stored in the temporary storage area of the RAM 73 are cleared at step S226. Thereafter, the program flow goes to step S227 of FIG. 8d.

Referring to FIG. 8d, it is judged whether or not the timer reservation key 55 has been turned on at step S231. If the timer reservation key 55 has been turned on (Yes at step S231), the program flow goes to step S232. On the other hand, the program flow returns.

Figure 9D:
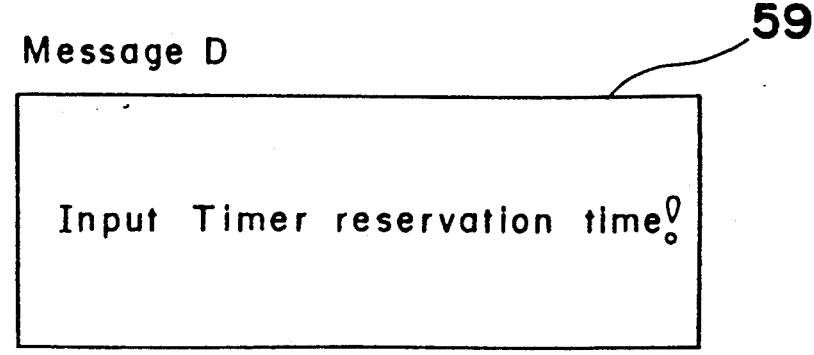

At step S232, there is displayed a message D "Input Timer reservation time !" shown in FIG. 9d on the LCD 59 so as to instruct the operator to input a reservation time in the broadcast communication mode, and then, it is judged whether or not one of a set of ten keys 54 of the key matrix unit 51 has been turned on at step S233.

If one of the number keys "0" to "9" of a set of ten keys 54 has been turned on at step S233, data corresponding to the turned on number key are stored in the temporary storage area of the RAM 73 at step S234 so as to add them to data having been stored therein already, and then, the program flow goes back to step S233. If the key "*" of a set of ten keys 54 has been turned on at step S233, data stored in the reservation time area of the RAM 73 are cleared at step S235, and then, the program flow goes back to step S233. If the key "#" of a set of ten keys 54 has been turned on at step S233, data stored stored in the temporary storage area of the RAM 73 are transferred into the reservation time area thereof and are stored therein, and data stored in the temporary storage area of the RAM 73 are cleared at step S236. Thereafter, the program flow goes to step S227.

At step S227, the control mode parameter CMP is reset to zero, and then, the program flow returns.

(b-5) Broadcast communication mode process

FIGS. 10a and 10b show the broadcast communication mode process (step S6) of a subroutine shown in FIG. 5.

Referring to FIG. 10a, it is judged whether or not the broadcast communication mode flag BCMF has been set at zero at step S401. If the broadcast communication mode flag BCMF has been set at zero (Yes at step S401), the program flow goes to step S402. On the other hand, if the broadcast communication mode flag BCMF has not been set at zero (No at step S401), the program flow goes to step S405.

At step S402, it is judged whether or not the transmission key 402 has been turned on. If the transmission key 402 has been turned on (Yes at step S402), the program flow goes to step S403. On the other hand, if the transmission key 402 has not been turned on (No at step S402), the program flow goes to step S430.

At step S403, a document image of a document set on the document table 2 is read by the CCD image sensor 6 of the image reader 31, and then, an electric image signal is outputted therefrom to the image signal processor 32. Thereafter, the electric image signal is binarized by the image signal processor 32 and is converted into binary image data, and then, the binary image data are encoded by the signal compressor 33 according to either the modified READ coding method or the modified Huffman coding method, and the encoded image data are stored in the RAM 34.

Thereafter, the broadcast communication mode flag BCMF is set at one at step S404, and then, it is judged whether or not the present time indicated by the clock 74 coincides with the reservation time stored in the reservation time area of the RAM 73 at step S405. If the present time coincides with the reservation time (Yes at step S405), the program flow goes to step S411 of FIG. 10b. On the other hand, if the present time does not coincide with the reservation time (No at step S405), the program flow goes to step S430.

At step S411, there is executed the transmission process for one destination subscriber which has been registered previously in the register mode and is a destination subscriber to which image data have not been transmitted yet up to the present time. Namely, first of all, there is performed a telephone line connection with the facsimile apparatus of the destination subscriber through the telephone line 30 by the telecommunication controller 36, and then, the image data stored in the RAM 34 at step S403 are read out, and a carrier signal is modulated according to the read image data and further is transmitted through the telecommunication controller 36 and the telephone line 30 to the facsimile apparatus of the destination subscriber by the transmission controller 35.

When the transmission process of step S411 is completed, it is judged whether or not the interval timer flag ITF has been set at zero at step S412. If the interval timer flag ITF has not been set at zero (No at step S412), the program flow goes to step S419. On the other hand, if the interval timer flag ITF has been set at zero (Yes at step S412), the time interval value stored in the RAM 73 is transferred into the interval timer 75 and is set therein, and then, the interval timer 75 is started to count the value at step S413.

Thereafter, it is judged whether or not the transmission condition is effected at step S414, namely, a document having image data to be transmitted to the destination subscriber has been set on the document table 2 and the transmission key 52 has been turned on, and then, it is judged whether or not the reception condition is effected at step S416, namely, an incoming signal has been received from the exchange.

If the transmission condition is effected (Yes at step S414), the aforementioned transmission process is executed at step S415, and then, the program flow goes to step S418. If the transmission condition is not effected (No at step S414) and the reception condition is effected (Yes at step S416), the aforementioned reception process is executed at step S417, and then, the program flow goes to step S418. If the transmission condition is not effected (No at step S414) and the reception condition is not effected (No at step S416), the program flow goes to step S418, directly.

At step S418, it is judged whether or not the interval timer 75 has counted up to the time interval value preset at step S413. If the interval timer 75 has not yet counted up to the preset time interval value (No at step S418), the program flow goes back to step S414. On the other hand, if the interval timer 75 has counted up to the preset time interval value (Yes at step S418), the program flow goes to step S419.

At step S419, it is judged whether or not the image data have been transmitted to all the registered destination subscribers. If the image data have not been transmitted to all the registered destination subscribers (No at step S419), the program flow goes to step S411 so as to execute the transmission process of the image data for the next destination subscriber. On the other hand, if the image data have been transmitted to all the registered destination subscribers (Yes at step S419), both of the broadcast communication mode flag BCMF for indicating whether or not the broadcast communication mode is set and the control mode parameter CMP are reset to zero at steps S421 and S422, respectively. Thereafter, the program flow returns.

Furthermore, it is judged whether or not the transmission condition is effected at step S430, and then, it is judged whether or not the reception condition is effected at step S432.

If the transmission condition is effected (Yes at step S430), the aforementioned transmission process is executed at step S431, and then, the program flow returns. If the transmission condition is not effected (No at step S430) and the reception condition is effected (Yes at step S432), the aforementioned reception process is executed at step S433, and then, the program flow returns. On the other hand, if the transmission condition is not effected (No at step S430) and the reception condition is not effected (No at step S432), the program flow returns, directly.

(c) Modifications

In the present preferred embodiment, there can be set into the interval timer 75 any time interval value corresponding a practical time interval between respective transmission processes executed in the broadcast communication mode depending a kind of a facsimile apparatus, using a set of ten keys 54 after pressing the interval timer key 58. However, the present invention is not limited to this, for example, a redial time interval may be preset at the interval timer 75. Furthermore, when the time interval value is set at zero, the process of the broadcast communication mode can be executed for a shorter time, without executing the other transmission and/or reception processes.

In the present preferred embodiment, respective transmission process of the same image data are executed at the preset time interval. However, the present invention is not limited to this. There may be made the facsimile apparatus capable of executing the other transmission and/or reception processes every time plural transmission processes such as five transmission processes are completed.

In the broadcast communication mode of the present present preferred embodiment, the same image data are transmitted to the facsimile apparatuses of plural registered different destination subscribers. The present invention is not limited to this. In the broadcast communication mode, respective different image data may be transmitted one by one to the facsimile apparatuses of plural registered different destination subscribers, respectively. Namely, the present invention can be applied to the above multicommunication reservation operation. In this case, there can be obtained the advantages similar to that of the facsimile apparatus of the present preferred embodiment.

Furthermore, the present invention can be applied to a facsimile apparatus for transmitting image data to only destination subscribers from which a reception request signal or communication request signal is received after polling them using the polling method and receiving the request signal therefrom, and/or for receiving respective image data transmitted from only destination subscribers from which a transmission request signal or communication request signal is received after polling them using the polling method and and receiving the request signal therefrom.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A facsimile apparatus comprising:
   detection means for detecting a transmission start signal and a reception start signal;
   communication means for communicating through a communication line by either transmitting image data therethrough or receiving image data therethrough when either said transmission start signal or said reception start signal is detected by said detection means;
   timer means for counting an elapsed time;
   automatic communication means for controlling said communication means so as to automatically communicate with facsimile apparatuses of plural pre-registered subscribers one by one through said communication line when an automatic communication mode is set; and
   control means for enabling said timer means to start to count the elapsed time and disabling said automatic communication means temporarily when said communication means has communicated with a facsimile apparatus of at least one subscriber completely in said automatic communication mode, and thereafter, enabling said detection means and said communication means until said timer means has counted up to a predetermined elapsed time.

2. The facsimile apparatus as claimed in claim 1, wherein said automatic communication means is enabled again when said timer has counted up to said predetermined elapsed time.

3. The facsimile apparatus as claimed in claim 1, wherein said timer means is started to count the elapsed time at a timing after said communication means has communicated with the facsimile apparatuses of plural subscriber completely in said automatic communication mode.

4. The facsimile apparatus as claimed in claim 1, wherein said control means controls said automatic communication means so as to automatically communicate with only said facsimile apparatuses of said subscribers from which a communication request signal has been received, after polling said facsimile apparatuses of said plural subscribers and receiving said communication request signal therefrom.

5. The facsimile apparatus as claimed in claim 1, further comprising:
   timer setting means for setting said predetermined elapsed time in said timer means before said timer means is started.

6. The facsimile apparatus as claimed in claim 1, further comprising:
   image sensor means for reading an image and outputting image data of said read image;

image storage means for storing said image data inputted from said image sensor therein; and printer means for printing an image of said image data received by said communication means on a piece of printing paper.

7. A method for transmitting and receiving image data through a communication line, including:

a first step for reading an image and outputting image data of said read image;

a second step for transmitting image data outputted at said first step to one of plural predetermined destination subscribers through said communication line;

a third step for detecting that said image data have been transmitted completely at said second step, and for starting a timer to count an elapsed time;

a fourth step for permitting transmitting and receiving image data through said communication line until said timer has counted up to a predetermined elapsed time;

a fifth step for detecting that said timer has counted up to said predetermined elapsed time, and for transmitting image data outputted at said first step through said communication line to the next one of plural predetermined destination subscribers except for those to which said image data have been transmitted completely; and a sixth step of repeating said third to fifth steps until said image data have been transmitted to all said plural predetermined destination subscribers.

8. The method as claimed in claim 7, further including a step for setting said plural destination subscribers at least before said second step.

9. The method as claimed in claim 7, further including a step for setting said predetermined elapsed time in said timer before said third step.

10. The method as claimed in claim 7, further including a step for polling said plural destination subscribers and receiving a communication request signal therefrom at least before said second step;

said image data being transmitted to only said destination subscribers from which said communication request signal has been received.

11. A method for transmitting and receiving image data through a communication line, including:

a first step for receiving image data from one of plural predetermined destination subscribers through said communication line, and for printing an image of said received image data on a piece of printing paper;

a second step for detecting that said image data have been received completely at said first step, and for starting a timer to count an elapsed time;

a third step for permitting transmitting and receiving image data through said communication line until said timer has counted up to a predetermined elapsed time;

a fourth step for detecting that said timer has counted up to said predetermined elapsed time, and for receiving image data through said communication line from the next one of plural predetermined destination subscribers except for those from which said image data have been received completely, and printing an image of said received image data on a piece of printing paper; and a fifth step of repeating said second to fourth steps until said image data have been received from all said plural predetermined destination subscribers.

12. The method as claimed in claim 11, further including a step for setting said plural destination subscribers before said first step.

13. The method as claimed in claim 11, further including a step for setting said predetermined elapsed time in said timer before said second step.

14. The method as claimed in claim 11, further including a step for polling said plural destination subscribers and receiving a communication request signal therefrom before said first step;

said image data being received from only said destination subscribers from which said communication request signal has been received.

* * * * *

UNITED STATES PATENT AND TRADEMARK OFFICE
CERTIFICATE OF CORRECTION

PATENT NO. : 5,040,077  Page 1 of 2
DATED : August 13, 1991
INVENTOR(S) : Hiroaki Hamano It is certified that error appears in the above-identified patent and that said Letters Patent is hereby corrected as shown below:

In col. 3, line 1, before "step", insert --a fourth--.
In col. 5, line 40, change "an" to --a--.
In col. 6, line 49, change "inputed" to --inputted--.
In col. 8, between lines 65 and 66, insert the following paragraph:

--If the interval timer key 58 has been turned on (Yes at step S302), the interval timer flag ITF is set at one at step S303, and then, the program flow goes to step S306. Otherwise (No at step S302), the program flow goes to step S306, directly.--

UNITED STATES PATENT AND TRADEMARK OFFICE
CERTIFICATE OF CORRECTION

PATENT NO. : 5,040,077

DATED : August 13, 1991

INVENTOR(S) : Hiroaki Hamano

It is certified that error appears in the above-identified patent and that said Letters Patent is hereby corrected as shown below:

In col. 8, line 67, change "S302" to --S304--.
In col. 8, line 67, delete "is" (second occurrence).
In col. 9, line 1, change "S302" to --S304--.
In col. 9, line 51, change "an" to --a--.
In col. 10, line 12, delete "stored" (second occurrence).
In col. 10, line 37, delete "stored" (second occurrence).
In col. 11, line 1, delete "stored" (second occurrence).
In col. 11, line 30, delete "stored" (second occurrence).
In col. 13, line 48, delete "present".
In col. 14, line 1, delete "and" (second occurrence).
In col. 14, line 49 (caim 3, line 5), change "subscriber" to --subscribers--.

Signed and Sealed this

Sixth Day of April, 1993

Attest:

STEPHEN G. KUNIN

*Attesting Officer*    Acting Commissioner of Patents and Trademarks